United States Patent [19]

Brown

[11] 4,167,730

[45] Sep. 11, 1979

[54] COMPRESSION OF DATA ON STATUS OF REMOTE EQUIPMENT

[75] Inventor: Harry H. Brown, Norristown, Pa.

[73] Assignee: General Electric Company, Schenectady, N.Y.

[21] Appl. No.: 788,664

[22] Filed: Apr. 18, 1977

[51] Int. Cl.² .......................................... H04Q 11/00
[52] U.S. Cl. ................................. 340/163; 340/147 R
[58] Field of Search ........... 340/151, 163, 408, 147 R; 325/58

[56] References Cited

U.S. PATENT DOCUMENTS

| Re. 29,450 | 10/1977 | Goldsby | 340/408 |
| 3,899,774 | 8/1975 | Binnie | 340/163 |
| 3,939,460 | 2/1976 | Horn | 340/408 |
| 4,027,243 | 5/1977 | Stackhouse | 325/58 |

Primary Examiner—Harold I. Pitts
Attorney, Agent, or Firm—Allen E. Amgott; Raymond H. Quist

[57] ABSTRACT

In communication system comprising plurality of earth stations tied together by relay (e.g. satellite-borne) in which status of individual subscriber line interface units must be continually reported to central control unit, only status changed since previous interrogation cycle is reported, with unchanged units being skipped over. When control is via satellite-borne relay, control unit sends interrogation commands to different stations at such time intervals that the report from one station arrives just as that from another station ends. For long transit times, this may result in all interrogation signals being transmitted before the first report in the sequence is received.

4 Claims, 4 Drawing Figures

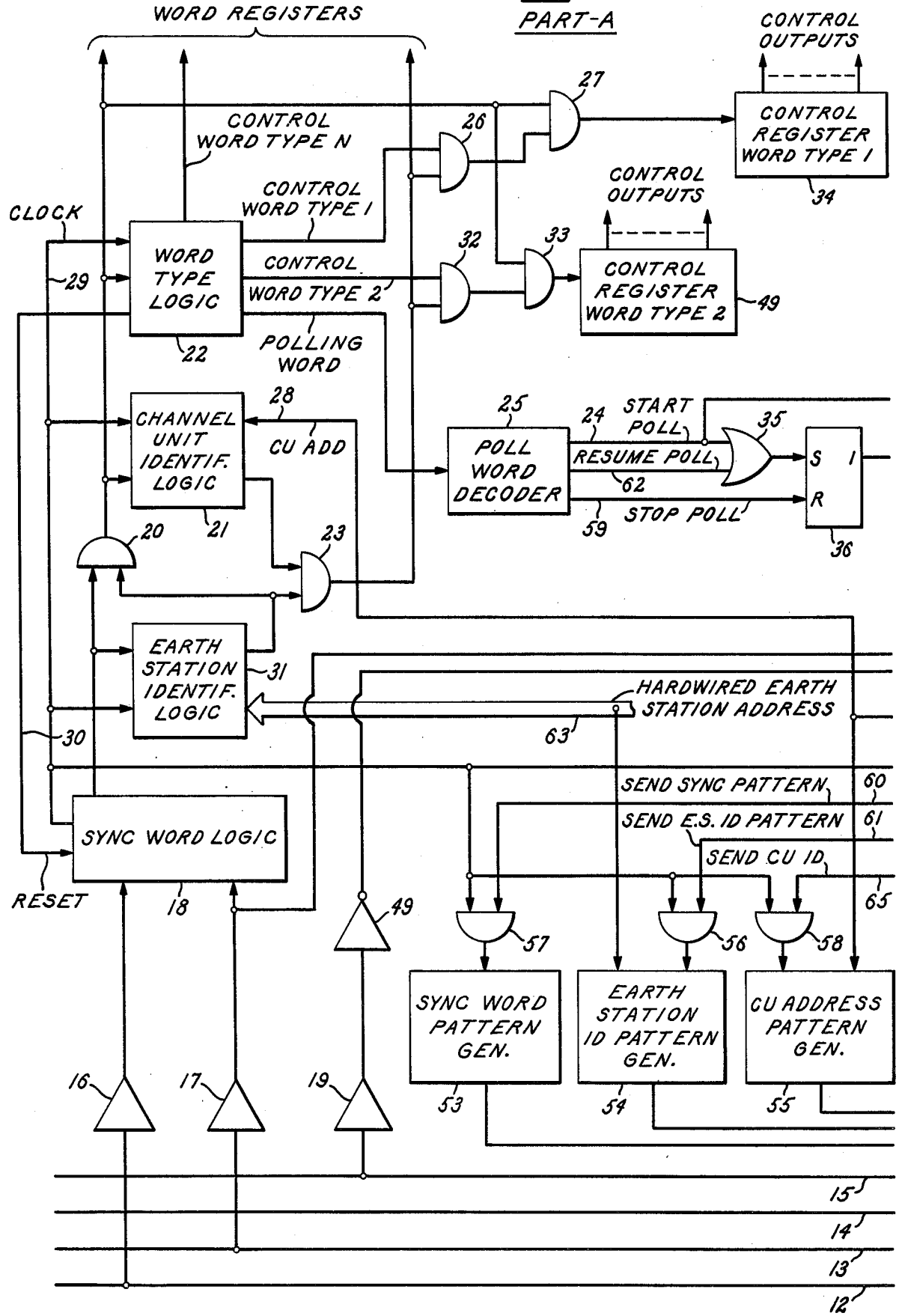
Fig. 2. PART-A

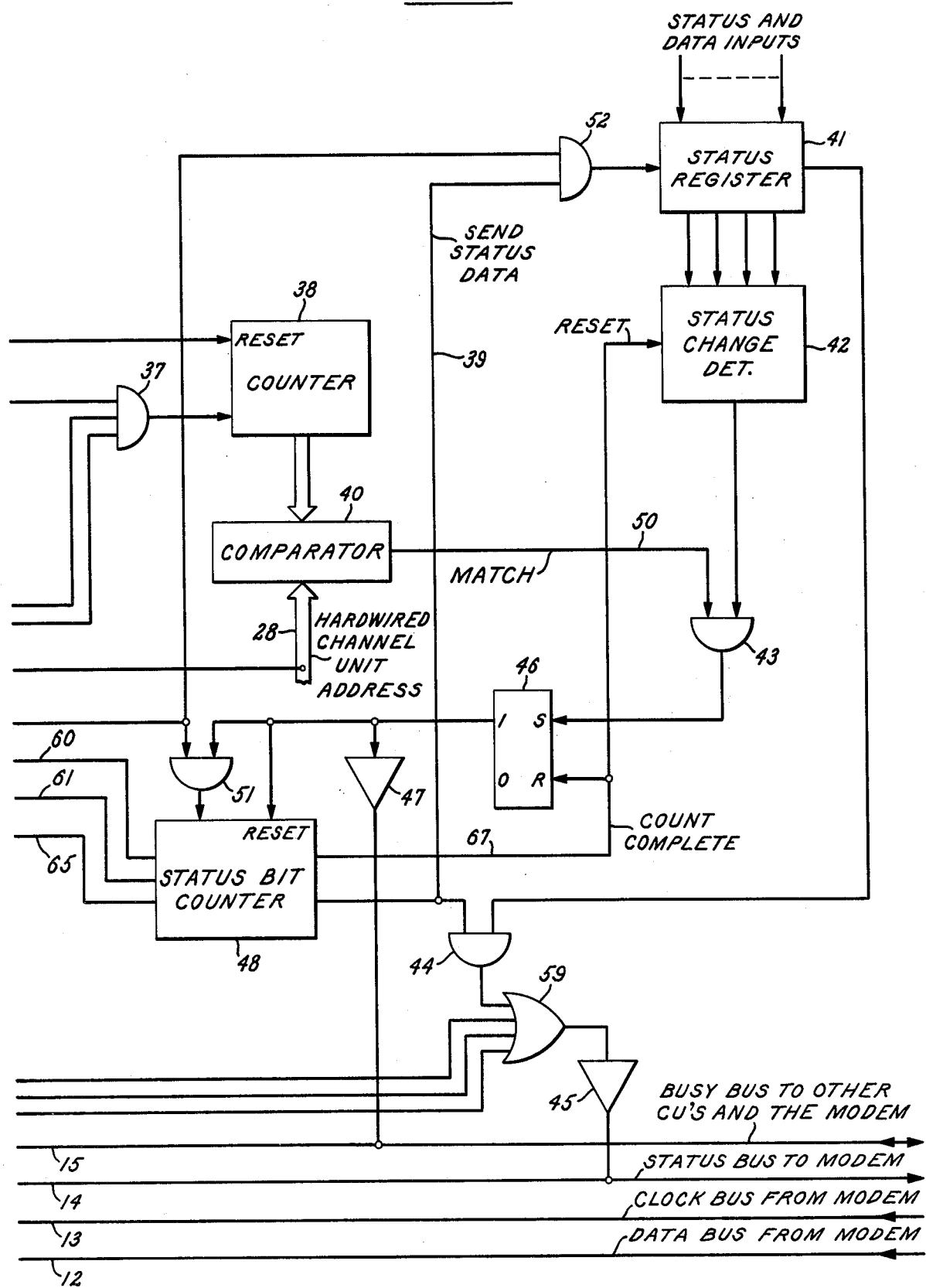

Fig. 3.

*CONTROL WORD*

| SYNC PATTERN | EARTH STATION ADDRESS | WORD TYPE | POLL WORD INSTRUCTION | CHANNEL UNIT ADDRESS | CONTROL WORD CONTENTS |
|---|---|---|---|---|---|

*STATUS WORD*

| SYNC PATTERN | EARTH STATION ADDRESS | CHANNEL UNIT ADDRESS | STATUS WORD CONTENTS |
|---|---|---|---|

COMPRESSION OF DATA ON STATUS OF REMOTE EQUIPMENT

BACKGROUND OF THE INVENTION

1. Field of the Invention

This invention pertains to the field of multichannel switching systems remotely controlled from a central control unit, in particular to satellite-borne relay systems with a plurality of ground stations each of which is itself a telephone exchange, as described in U.S. Pat. No. 3,842,350 of Gross (U.S. Cl. 325/4).

2. Summary of the Prior Art

Indicating the status of a single communicating device to however large a number of interested persons (or devices) is simple; the "abc" or "v" wheels of coastal radio stations require only a single communication channel no matter how many receivers hear them. To report the status of a large number of communicating devices to a single control unit is a quite different problem; it is exacerbated if the method involves interrogation by the control unit over a channel causing appreciable time delay and reply over a channel causing a like delay. The roughly fifty-thousand mile round trip to a synchronous terrestrial satellite and back will itself impose a transit-time delay of about 0.27 seconds, apart from any delays in the relay device itself. Thus a double round trip for interrogation and reply would impose a delay of about 0.6 seconds.

The applicant has not searched the extremely voluminous and crowded telephone art. He is generally familiar with three approaches to the problem of reporting of multiple status data. Comsat Corporation's SPADE system does not not have a central control, and provides communication among a plurality of stations by time sharing—that is, assignment of a given time period for communication between a specific pair of stations. In another instance, data from ground-based sensors to a surveying type of satellite is repeated so that overlap will not cause loss of data; what is lost once by overlap with other data will be caught on a later repetition. Comsat Corporation's MARISAT also relies upon repetition to eliminate the consequences of overlap from various sources.

U.S. Pat. No. 3,842,350 of Gross, assigned to the assignee of the present application, in column 12, line 54, through column 14, line 42, describes how data of any kind stored in a given channel interface unit (therein designated as a trunk access unit or acronym TAU) may be read out in its due sequence, and the channel be skipped if there is no data to be read out. It does not provide for intermingling transmission of status messages with other service messages, nor for initiating the transmission of status messages and causing this to continue independently (while other service message traffic may be handled) until another order to stop the transmission of status messages is received.

None of the prior art known to the applicant teaches the transmission of status data by automatic time sharing with other types of service messages responsively to an initiation signal, continuing without further command until a second termination signal is received; nor a method for causing reports from different locations to arrive in close but nonoverlapping time sequence at a central control unit despite long transit times for signals between the locations and the central control unit.

SUMMARY OF THE INVENTION

The environment of this invention is a communication system in which each of a number of ground stations connected by a remote relay, in general satellite-borne, has a number of incoming subscriber channels, each of which is connected into the system through an interface unit, described herein as a channel unit, acronym CU. Each interface unit or CU is capable of being tuned to any one of a number of transmitting frequencies and any one of a number of receiving frequencies; these are assigned as required by a central control located at one ground station. For optimum utilization of the available frequency channels, it is essential that the central control be kept informed continually of the status of each CU,—that is, if it is awaiting a frequency assignment, or has terminated its message and no longer requires its assigned frequencies, and the like. In the present invention, the central unit is assumed to address each CU with the earth station identification, followed by a control word indicating that status information is requested, which is herein designated for obvious reasons as a "poll" word. Means are provided to identify the earth station and the CU address, and thereupon to enter the control word into a function table which activates an output lead indicating that a poll word has been received. A signal indicating the current status is stored in a register, and connected to means for determining if there has been a change in status since the last poll. If there has been no change, the CU does not respond. If there has been a change, the CU generates a signal giving its earth station and CU address and the status signal. While it is transmitting this message, it produces a signal on a busy bus which inhibits transmission by any other CU. If the busy bus has a signal on it when the CU first attempts to send its message, it is delayed in doing so until the busy bus signal has terminated. Thus every CU which has a status change to report will report its status, and no other CU will do so. This reduces channel use time to the minimum, since only one pulse time is used to pass by an unchanged CU.

A single communication frequency channel is used to transmit service messages to the channel units; and another single communication frequency channel is used to transmit service messages from the channel units. However, polling messages are identified by their coded word type identification and entered simultaneously into special registers in all channel units, where they initiate performance of the polling order by all channel units without further instruction; other service messages are examined not only for earth station address but also for channel unit address and entered into other order registers only in the particular channel unit addressed. Service messages from the channel units responsive to either kind of order message are transmitted over the same outgoing frequency channel on a demand basis.

If a satellite-borne relay is employed, the transit time from the central control may be comparable with, or longer than, the time required for the status report from a given earth station. It is therefore possible and economical of time for the central control to address the channel units in a given earth station, and then address the channel units in a next earth station. The replies from the two successively addressed earth stations will arrive in close succession but without overlap.

BRIEF DESCRIPTION OF THE DRAWINGS

FIGS. 2A and 2B represents the portion of a CU which pertain to the functioning of the invention.

FIG. 3 represents the structure of typical words in a given coding pattern.

DESCRIPTION OF THE PREFERRED EMBODIMENT

Figure 1:
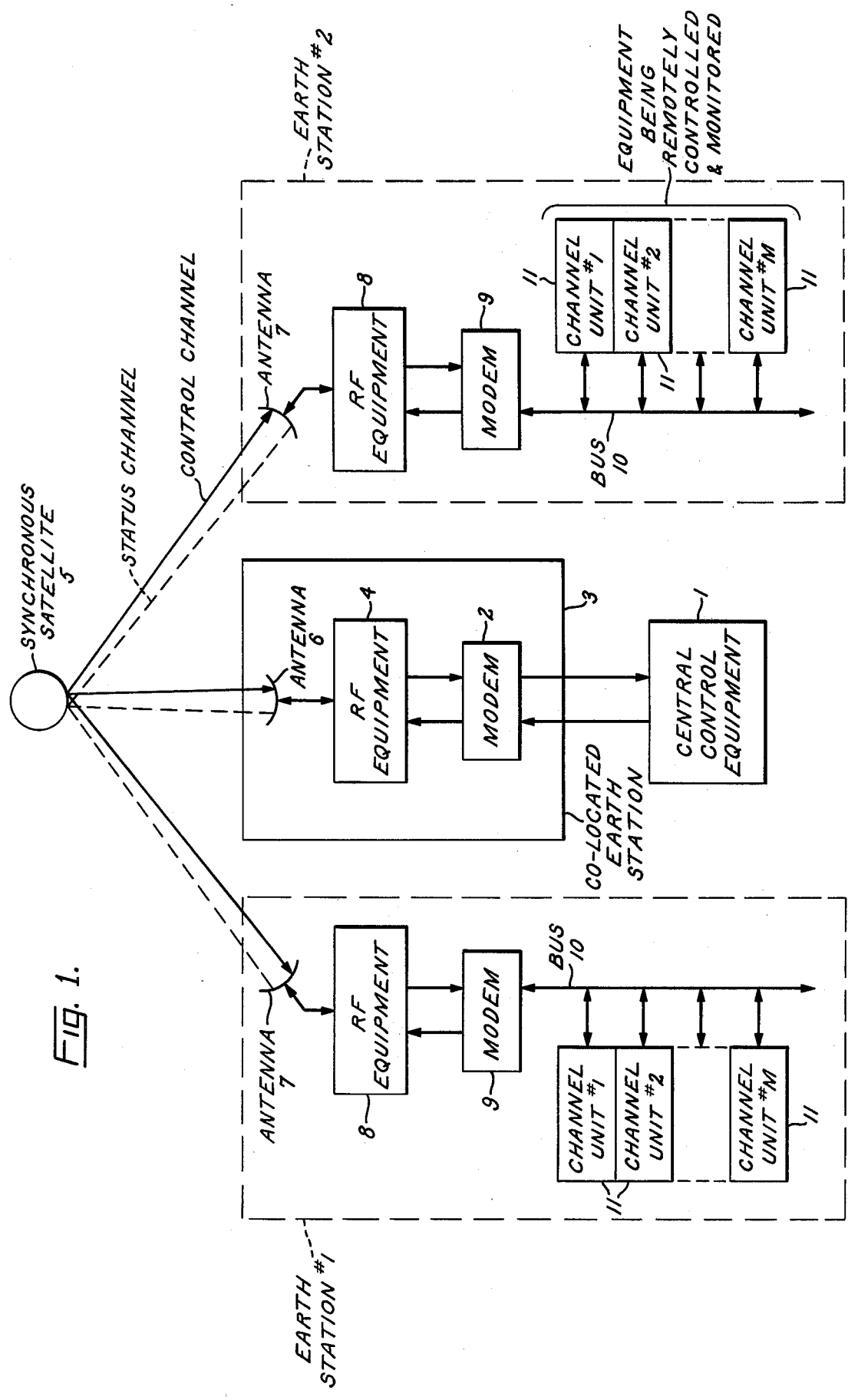
FIG. 1 represents generally the arrangement of the earth stations and the satellite-borne relay.

FIG. 1 represents in block diagram form the central control equipment 1, which is connected for transmission and reception to a modem (compressed abbreviation of modulator-demodulator 2, in earth station 3. Modem 2 is connected to radio-frequency equipment 4 which effects appropriate frequency translation and amplification of outgoing signals to the receiving frequency band of the relay in synchronously orbiting satellite 5, and receives and translates incoming signals in the transmitting frequency band of the satellite relay, both via antenna 6.

Earth stations #1 and #2 have antennas 7, radio-frequency equipments 8, and modems 9 which perform the same functions as the like-named devices in earth station 3. The modems 9 are connected to a single-line bus 10 which is actually a plurality of channels for transmission, reception, and clock distribution, to channel units 11. More detail of the apparatus actually appropriate to the antennas 7 and the modems 9 may be found in the Gross patent cited. The dual lines labelled "Status channel" and "Control channel" are intended to indicate that separate frequency channels are dedicated to transmission of service messages from central control, and to service messages back to it.

FIGS. 2A and 2B represents parts of a channel unit 11 and the buses associated with its functioning. Data bus 12 extends from a modem 9, carrying order messages which are transmitted by central control over a dedicated channel, not only to all channel units in a given earth station but to more than one earth station. Bus 13 carries clock signals from the modem 9. Status bus 14 feeds status reports to modem 9, which causes them to be transmitted on another channel dedicated to reports. Busy bus 15 is connected to modem 9 and to all the channel units to inhibit them from transmitting if another channel unit is transmitting messages. Modem 9 may be equipped with means to recognize the earth station address and the poll word, and then activate busy bus 15 to inhibit transmission by any of the CUs until it has transmitted the synchronization message which is necessary to synchronize the modems. Then it lets busy bus 15 fall to zero so that the various CUs transmit their status messages.

A receiver 16 is connected to the data bus 12; it receives data signals and transmits them to synchronization word logic 18, which also receives timing pulses from receiver 17, which receives them from clock bus 13. Because words are not spaced as in ordinary telegraphy, but continue without interruption, it is necessary to provide a marker for the beginning of a message to permit synchronization of detection equipment with the actual word sequence. This is provided, in the simplest case, by a succession of ones longer than any such succession possible in any significant code combination. An active shift register (that is, one which continues to produce outputs after it is filled) connected at all its ones outputs to an and gate will perform the function of identifying such a synchronization signal. The output of such an and gate may be connected to inhibit a gate feeding the output of receiver 16 to the shift register, and to feed the output of receiver 16 instead to gate 20 and to earth station identification logic 31. Earth station identification logic 31 may also be an active shift register whose outputs are connected to an and gate in such an arrangement of ones and zeroes as will produce an output when the register contains the address of the earth station. As a matter of manufacturing convenience, it may be preferable to provide an active shift register in 31 without the implied permanent internal connection embodying the earth station address, but to provide these or equivalent connections as hardwired earth station address 63.

Clock lead 29 is represented as emerging from synchronization word logic 18. This may merely be the same as the clock signal received via receiver 17. However, it is desirable that gate 37 (which controls some internal data processing which need not be identical with the general system signal pulse rate) be clocked at a faster rate. In such alternative, the clock rate on clock bus 13 may be a multiple (preferably a binary multiple) of the system signal pulse rate. This may be effected either by transmitting this higher clock rate over a dedicated channel from the central control 1, or by transmitting the clock at the signal pulse rate, and providing (in association with modem 9) a higher frequency pulse generator which is synchronized with the clock from the central control 1. In either case, the units which must use the clock in reading the data pulse must receive clock pulses at the lower rate. This may be done by providing a counter in synchronizaton word logic 18, and feeding the counted-down clock pulses on lead 29. Since synchronizing word logic 18 itself must read data bits it will also use the lower rate clock for this purpose.

The output of earth station identification logic 31 is fed to open gate 20 and enable gate 23. The next item in the control word sequence, which is represented graphically in FIG. 3, is a word type signal. This is merely an encoded identification of a particular type of control word among the plurality which are part of the control vocabulary of the system. For the present disclosure, only the "poll" instruction is of interest. The opening of gate 20 permits word type logic 22 to receive the next set of data pulses. Word type logic 22 receives these pulses and decodes them uniquely to excite an output lead uniquely associated with a particular word type as represented by leads marked as representing variously numbered control words from 1 to N, and one particular lead marked "polling word". As FIG. 3 indicates, the next content of a poll instruction after the word type identifies the instruction as such is the instruction itself. This is sent by word type logic 22 to poll word decoder 25, which decodes it into one of the three possible orders "Start poll", "Resume poll" or "Stop poll". The excitation of the polling word lead initiates a two pulse delay in word type logic 22, after which it sends a reset via lead 30 to synchronizaton word logic 18, permitting it to start looking for another synchronizaton word. The polling word has no need for a channel unit address because it is directed to all the channel units on the bus. For any other type of control word which is addressed to a particular channel unit the channel unit address, which is next in the control word sequence, enters channel unit identification logic 21. In the actual embodiment of these two devices they comprise a single shift register fed through gate 20, initially into the register portion assigned to channel unit identification 21 and being shifted through that and thence into the register portion assigned to word type logic 22.

Channel unit identification logic 21 has been described as comprising a shift register; its register terminals may be connected to a comparator which receives from a hard-wired source 28 the ones and zeroes representing the channel unit address. If the comparison is affirmative, showing that the address stored is that of the particular channel unit, an output is produced which is gated by gate 23 with the affirmative output of earth station identification logic 31, and produces a signal on lead 64 which signifies that this channel unit of this earth station is the one being addressed. This gated output is gated with each of the word type signals from word type logic 22, and the latter gated output is used to gate the control word contents (via gate 20) to an appropriate order register. Thus Type 1 words are gated by the output of gate 26 through gate 27 to register 34; Type 2 words are gated by the output of gate 32 through gate 33 to register 49; and poll word contents are sent directly without channel unit address checking to poll word decoder 25, which may be a register with a decoding logic combined, or what is modernly called a read-only memory.

It is only after the appropriate control word register has been filled that the synchronization word logic 18 should be reset. The word type logic 22 may be provided with a counter which counts pulses after its own register is filled, and transmits a reset signal 30 after enough pulses have been received to fill the channel unit identification logic 21 and the particular control word register.

Given that poll word decoder has received a signal which it decodes as "Start poll" by producing a signal on line 24, this signal passes buffer 35 to the set terminal of flipflop 36, whose one output thereupon is fed to gate 37. This gate also receives from receiver 17 the clock pulses from clock bus 13. These are assumed to be fast clock pulses, faster than the ones produced on clock line 29. If there is a busy signal on busy bus 15, this will be detected by receiver 19, inverted by inverter 49, and produce an inhibition of gate 37 until the busy signal disappears, when inverter 49 will provide an enabling signal on gate 37, and fast clock pulses will step counter 38, whose outputs in parallel will be fed to comparator 40, which receives the channel unit address from hard-wired source 28. The signal on line 24 also resets counter 38 to zero. It appears worthy of observation here that a "Resume poll" signal on line 62 will pass buffer 35 to set flipflop 36, but will not reset counter 38, so that counter 38 will merely continue its previous count, not begin anew. A "Stop poll" signal on line 59 resets flipflop 36 and stops counter 38.

The preceding is substantially merely prologue to the actual operation of determining if there is a status change to report, and doing so if there is one.

The output of counter 38 is compared with the hard wired channel unit address from source 28 by comparator 40. When the two are equal, comparator 40 produces a "match" signal on line 50 which enables gate 43. Status data, appropriately coded, is stored in status register 41. This register is kept current in its information, being updated whenever a status change occurs. Its change is detected by status change detector 42. It is possible to provide information of some status conditions which are not themselves of such immediate interest as to justify sending a status report merely on their account, but are worth including in a status report necessitated by a more important status situation. Therefore, in the general case, status change detector 42 will monitor only priority bits of register 41. Status register 41 may, when its content is read out for transmission, be read out by shifting out its content and thus emptying it; but it will quickly be refilled with the same status data, if that has not changed during the read-out interval. In general, it will be filled in parallel, since different groups of bits will have different status significance, and it would require much wasteful recirculation to change only the first bits in the register. The status change detector 42 may comprise a plurality of individual bistable stages, of which each one has its stepping or trigger terminal connected to the trigger terminal of a priority bit of the status register. All these stages of status change detector 42 have a common reset terminal; and their outputs are buffed together so that if any stage has been triggered, there will be an output. Let it be assumed for a first case that there has been no status change since the last report, and that therefore there is no output from status change detector 42. Then gate 43 will not give an output, flipflop 46 will not be set, and counter 38 will run on past the channel unit address and count until it is reset by a "Stop poll" signal on line 59. This brings to attention an important point: it has been mentioned that the polling word is sent to poll word decoder 25 directly from word type logic 22. Word type logic 22 is fed its input through gate 20, which indicates only that the synchronization signal has been duly received, and that the message is for the given earth station. These conditions will apply to all channel units in a given earth station. Therefore they will all receive the decoded messages to start, stop, or resume the poll, and will all start and stop their counters simultaneously. This causes each channel unit to be interrogated in its numerical sequence, so that every channel unit will come up in turn to report; but if it has nothing to report, the address counters in all the channel units run on to the next count with no delay for the mute channel unit except the one fast pulse used to step counter 38.

Passing to the second case, that status change detector 42 has an output (may indeed have had an output even prior to the order to begin polling) the match indication of line 50 opens gate 43 and permits the output of status change detector 42 to set flipflop 46 so that it produces an output at its "one" terminal. This excites line driver 47, which puts a busy signal on busy bus 15 and via the detector 19 and inverter 49 in each channel unit, stops all counters 38, including the one under consideration in the represented embodiment. The "one" signal also resets status bit counter 48 to zero and opens gate 51 to slow or data-rate clock pulses from 29. Status bit counter is in fact a small register program, hard-wired to order the performance of various functions according to the status word format represented schematically in FIG. 3. In accordance with this format, Gate 57 is first opened to allow clock pulses from 29 to drive synchronizaton word pattern generator 53 to send the synchronization word through buffer 59 to line driver 45, which puts its signal on status bus 14 for transmission to the modem, which causes its transmission to central control 1 on a frequency channel dedicated to such traffic. After this has been completed (which status bit counter determines by counting the clock pulses used) it excites earth station identification pattern generator by gating clock pulses to it through gate 56; and immediately thereafter, it excites channel unit address pattern generator 55 by gating clock pulses to it via gate 58. After these transmissions are complete, it excites line 39 to gate clock pulses via gate 52 to status register 41, which thereupon shifts out its register content via gate 44 which is also opened by the signal on line 39; this gate keeps any changes in status register 41 which may occur during the transmission e.g. of the preceding three status word parts components from producing transients which might appear as inputs to buffer 59. When the status register 41 has been read out to the central control, status bit counter 48 sends a "count complete" signal via line 67. This resets flipflop 46 and turns off the output of its "one" terminal. It also resets status change detector 42 so that it will indicate only subsequent changes in status register 41 (which must either have been read out non-destructively, or must have been refilled before the resetting of status change detector 42). Line driver 47 no longer has an input; the signal on busy bus 15 disappears, permitting all channel unit counters to resume counting until the next channel unit having status traffic is reached in the address count.

It may be seen that a "Stop poll" signal on 59 will merely reset flipflop 36, open gate 37, and stop counter 38 at its existing registration. A "Resume poll" signal on 62 will set flipflop 36 and open gate 37, but will not reset counter 38 to zero; it will take up counting at its previous registration. Thus central control may, at its option, allow enough time for polling of only a fraction of the channel units during one scan, and poll the remainder at a later time. This is, of course, subject to statistical determination of the exigencies of control and channel use, and not subject to analysis here.

It may be observed that once the poll word decoder has controlled flipflop 36, the remainder of the operation is strictly autonomous (which is why it is possible to use fast clock pulses to drive counter 38). Other word types may be received, fed into other control registers, and perform other operations. When central control desires to stop the poll, it must send another message ordering that.

An alternative mode of operation may be based upon the provision at each earth station of a timer or counter which permits the polling operation to continue for a predetermined number of time periods, and then stops it.

Since the transit time from central control to the different earth stations may differ because of their different locations on the earth, it is desirable to consider when polling and stop commands should be addressed to two different earth stations in order that the status reports from the second may arrive at the central control approximately (with a small safety interval) when the status reports from the first earth station end arriving at central control. This requires, for convenience, definition of some symbols.

$P1$ is the clock time at which central control sends out a polling order to Earth Station (ES) 1.

$T1$ is the transit time between central control and ES1 in one direction.

$P1 + T1$ is the clock time at which the polling order arrives at ES1.

$P1 + 2\,T1$ is the clock time at which the status report begins arriving at central control.

$S1$ is the clock time at which central control sends out a stop poll order to ES1.

$S1 + T1$ is the clock time at which the stop poll order arrives at ES1.

$S1 + 2\,T1$ is the clock time at which the end of the status report arrives at central control.

$S1 - P1$ is the length of the status report from ES1, it may be designated L1.

If the length of the status report from ES1 is determined by a timer at ES1 the designation L1 may be used for the length of the status report thus determined. In either case, the clock time at which the end of the status report from ES1 reaches central control may be expressed as:

$$P1 + L1 + 2\,T1$$

Similar times and time intervals for ES 2 are expressed by substituting the numeral 2 for 1 in the above definitions.

It is desired to send the polling order to ES2 at such a time that its status report will begin to arrive at central control slightly after the end of the arrival there of the status report from ES1. This requires that $P2 + 2\,T2$ (the clock time of arrival at central control of the beginning of the status report from ES2) be slightly greater than $P1 + L1 + 2\,T1$. This implies that P2 must be slightly greater (that is, as clock time, later) than $P1 + L1 + 2(T1 - T2)$. Such timing will cause the status report from ES2 to begin arriving just safely after the ending of the arrival of the status report from ES1, without overlap. The timing of orders to other earth stations may, obviously, be determined in like manner.

It is to be noted that if L1 is small compared with T1 the order to ES2 may be sent from central control before the order to ES1 reaches ES1. Also, if T2 is greater than T1, there is a possibility that $L1 + 2(T1 - T2)$ may be negative, in which case P2 will actually occur earlier than P1. If the stop poll orders S1 and S2 are used, the time interval between P1 and S1, and between P2 and S2 will be determined by the desired lengths L1 and L2 of the respective status reports. The primary calculation is of the relation between P1 and P2.

It has been tacitly assumed that the delay between the arrival of a P signal at an ES, and the reply will be negligible compared with the other time intervals involved. If, as is reasonable to assume, the delay at each ES is the same, the times of arrival of status reports at central control will all be delayed by that amount, and their relative arrival times will not be altered. Similarly, the reference in the preceding to status report signals from ES 2 beginning to arrive at central control just safely after the termination of the arrival at central control of status report signals from ES1 is intended to indicate that $P2 + 2\,T2$ is greater than $P1 + L1 + 2\,T1$ by an amount sufficient to include all timing errors and uncertainties such as time jitter anywhere in the system, and variations in delays anywhere in the system; for present purposes this may be taken to define "slightly" greater.

The operation of the preferred embodiment has been described in rather specific terms: the teaching of the disclosure is actually broader than the specific embodiment and application. The channels interfaced by the channel units are generically remote devices divided among earth stations, or more broadly major groups having addresses or identification, the channel units having CU addresses for identification within the group. A channel unit has means to receive, identify, and execute service commands (such as Type I or Type II control words) which are addressed by group identification (earth station) and individual identification (CU address); the control outputs from registers 34 and 49 provide the means for executing the commands. Failure of the earth station identification 31 match or of the channel unit identification 21 will inhibit gate 20 or gate 23, and so will cause the channel unit to refrain from executing service commands addressed to another channel unit. However, the channel unit does have means to receive, identify, and execute polling commands addressed only by the earth station, or group, identification, since poll word decoder 25 does not depend upon a match of channel unit address. Counter 30, synchronously with other like counters in other channel units on the same bus, enumerates the successive channel addresses, stopping when the address of a channel unit is reached which has status change to report, and starting again when the status data has been transmitted. The three different polling instructions permit starting the poll at the beginning of the roster, by resetting to the beginning, or resuming the enumeration at the next point after the one at which the stop instruction was received. Once the flipflop 36 has been set, the enumeration will continue by itself, while other service commands may be received and routed to control registers for execution of such commands.

The principles embodied in the CU may be applied on a simpler basis for scanning and reporting the status of a large number of data sources in a common system. A simple example of such a system is a large building or a large vessel equipped with a number of temperature sensors throughout its volume. Sudden localized temperature increases in such structures are strongly indicative of fire; slower more widely distributed temperature changes from solar movement or the entry of a large number of persons into an auditorium may be useful in controlling airconditioning. A subassembly comprising reference items 13, 14, 15, 17, 24, 36, 37, 38, 39, 40, 41, 42, 43, 44, 45, 46, 47, 48, 50, 51, 52, 55, 58, 59, and 65 may be used to count continuously by counter 38 to enumerate all the data sources which may have occasion to report changes in status—in the assumed instance,—reporting them on a common bus, such as 14. It is not contemplated that the enumeration will have occasion to be stopped, but the start poll lead 24 will require to be pulsed occasionally by a common start poll word to set all the counters 38 into synchronism as insurance against a lapse. The sync word pattern generator 53 has been omitted, since the relatively smaller quantity of data needed to be sent, and the simpler transmission circuit are assumed to permit a less compressed signal format. Various systems intermediate between the described simple system and the full embodiment of FIG. 2 may obviously be employed according as various of the functions of the full embodiment are required.

Equipment embodying this invention was tested for development purposes with final satisfactory results, and was first sold on 15 June 1976. The devices sold have been in commercial use.

What is claimed:

1. In a system for securing, at a central control, information on the status of a plurality of remote devices
   (a) divided into major groups each having an assigned identification;
   (b) having each an assigned identification in the group;
   (c) each device having means to receive, identify, and execute service commands from the central control addressed to the device by group identification and by individual identification within the group, and to refrain from executing service commands addressed to another device;
   (d) each device having means to receive, identify, and execute polling commands from the central control, addressed to the device by group identification only, to enumerate synchronously with other devices in the group the successive individual identifications of the devices within the group, to stop such enumeration when the identification is reached in the enumeration of a device having status information new since the last such enumeration while the device transmits such status information, and to continue the enumeration when such information has been transmitted; the improvement comprising:
   (e) means to identify and execute a polling command to begin the said enumeration, and to continue the said enumeration during the subsequent reception, identification, and execution of service commands;
   (f) means to identify and execute a polling command to stop the said enumeration.

2. The improvement claimed in claim 1 in which the said means to identify and execute a polling command to begin the said enumeration comprises means to identify and execute a first polling command to begin the said enumeration at a fixed initial individual identification, and means to identify and execute a second polling command to resume the enumeration at the next individual identification after the identification last enumerated before the last preceding stopping of the enumeration.

3. In a system comprising a plurality of at least two remote stations 1 and 2 controlled by a central control via communication channels whose one-way transit time between the central control and station 1 is T1 and between the central control and station 2 is T2,
   in which a signal to station 1 from central control elicits a reply of length L1, and
   a signal to station 2 from central control elicits a reply,
   the method of operating the system which comprises:
   sending a said signal to station 1 at a clock time P1;
   sending a said signal to station 2 at a clock time P2 which is slightly greater algebraically than P1+L1+2(T1−T2).

4. In a system comprising:
   (a) a plurality of separately identified data sources;
   (b) a central control which is adapted to receive data;
   (c) a data-transmitting channel extending to each data source and to the central control;
   (d) a control signal channel extending from the central control to each data source;
   (e) a "busy" signal channel extending to all data sources and to the central control;
   (f) a source of clock pulses available at each data source and at central control;
   the improvement which comprises, in combination; at each data source:
   (g) a store of data, controllable to be read into the said data-transmitting channel;
   (h) a change detector connected to the store of data to detect changes in the stored data and responsively to detection of such change to produce an output signal;
   (i) a counter connected to receive clock pulses from the clock pulse source and responsively thereto to be stepped through a count sequence enumerative of the identifications of all the data sources in the said plurality, to receive a control signal over the control signal channel and be reset to a reference condition thereby, and to transmit its count to (j) a comparator which responsively to the said count generates an output signal when the said count matches the identity of the data source; and when enabled by an output signal from the change detector transmits an output signal to (k) sequencing means which, responsively thereto, (1) produces a "busy" signal on the "busy" signal channel which stops the feeding of clock pulses to the said counter;

(2) causes the transmission of the identification of the data source to the data-transmitting channel for transmission to central control;

(3) causes the transmission of the data from the said store to the data transmitting channel for transmission to central control;

(4) resets the change detector to terminate its output; and (5) terminates the "busy" signal on the "busy" bus.

* * * * *